United States Patent [19]

Yates

[11] Patent Number: 4,790,904
[45] Date of Patent: Dec. 13, 1988

[54] PLATING EVAPORATIVE RECOVERY TANK

[76] Inventor: William Yates, 403 N. Powder Horn, Anaheim, Calif. 92807

[21] Appl. No.: 51,730

[22] Filed: May 19, 1987

[51] Int. Cl.$^4$ .......................... B01D 1/12; B01D 1/16
[52] U.S. Cl. ...................................... 159/16.1; 159/3;
159/901; 159/DIG. 2; 159/DIG. 40; 159/DIG. 41; 202/176; 202/197; 202/236; 203/12; 203/40; 203/49; 203/90; 55/222; 55/244; 55/248; 204/237; 204/239; 204/241; 261/112.1
[58] Field of Search ................... 159/16.1, 3, DIG. 41, 159/901, DIG. 2, 48.1, DIG. 40; 203/12, 90, 40, 49; 202/197, 236, 201, 203, 176; 415/116; 204/237, 239, 241; 55/222, 244, 248; 261/112.1, 30

[56] References Cited

U.S. PATENT DOCUMENTS

| | | | |
|---|---|---|---|
| 814,405 | 3/1906 | Smith | 202/163 |
| 2,984,081 | 5/1961 | Hahn | 204/239 |
| 3,223,596 | 12/1965 | Fuller | 202/201 |
| 3,565,767 | 2/1971 | Light | 159/16.1 |
| 3,903,212 | 9/1975 | Lefevre | 261/30 |
| 3,979,220 | 9/1976 | Ishiyama et al. | 204/239 |
| 4,213,769 | 7/1980 | Nagelmeyer | 55/244 |
| 4,310,382 | 1/1982 | Gress | 159/16.1 |
| 4,341,739 | 7/1982 | Ellis et al. | 261/112.1 |
| 4,375,975 | 3/1983 | McNicholas | 261/112.1 |
| 4,477,394 | 10/1984 | Armstrong et al. | 261/112.1 |
| 4,534,828 | 8/1985 | Erickson et al. | 159/16.1 |
| 4,613,412 | 9/1986 | MacDumid | 202/174 |

FOREIGN PATENT DOCUMENTS

| | | | |
|---|---|---|---|
| 0024930 | 12/1956 | Fed. Rep. of Germany | 203/49 |
| 1902956 | 8/1970 | Fed. Rep. of Germany | 203/49 |
| 0071080 | 6/1979 | Japan | 159/16.1 |

Primary Examiner—David L. Lacey
Assistant Examiner—V. Manoharan
Attorney, Agent, or Firm—Francis X. LoJacono

[57] ABSTRACT

An atmospheric evaporator for reducing the water content of various chemical solutions, more particularly useful in the electroplating industry, wherein the evaporator includes a solution-secure molded tank in which a removable blower sleeve is mounted having a blower inlet duct and support strut members formed at the opposite end thereof to support a multiplicity of finned evaporator members over which the solution is sprayed. When a large-volume, low RPM blower is mounted to the inlet duct, a straight-line downdraft of both air and solution is created, allowing the air and evaporated water to exhaust through an up-facing outlet duct, thus defining a substantially "U" shaped duct arrangement from the inlet side to the exhaust side of the tank with the heavy chemical particles returning to the process tank from the bottom of the evaporator tank.

5 Claims, 3 Drawing Sheets

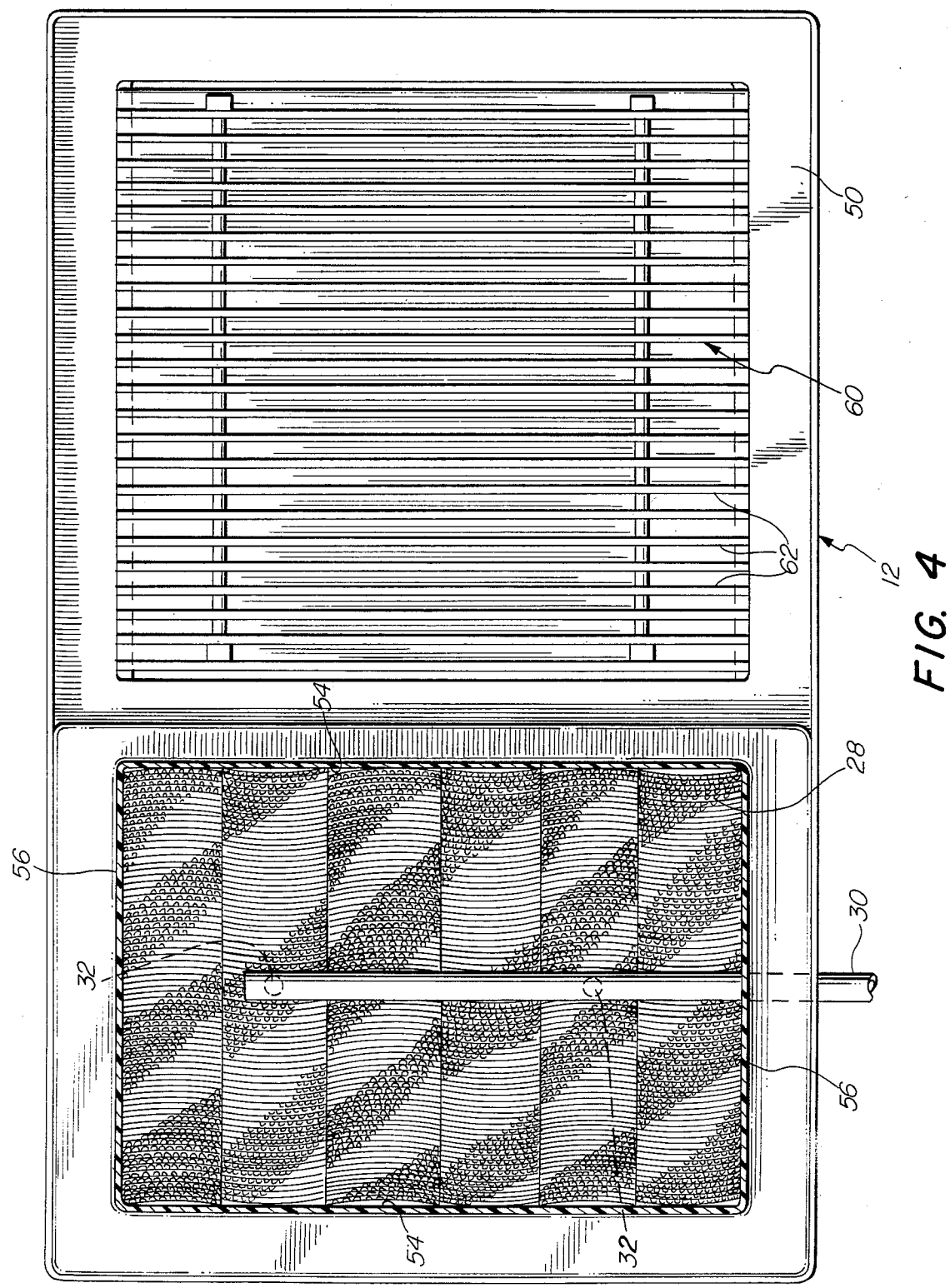

PLATING EVAPORATIVE RECOVERY TANK

BACKGROUND OF THE INVENTION

This invention relates generally to a plating evaporative recovery tank, and more particularly to a plating evaporative recovery tank which includes a removable blower sleeve.

As is well known in the art, various problems and difficulties are encountered in providing suitable means for evaporating water from a solution to the atmosphere. This is especially true with respect to solutions provided in electroplating processes wherein large amounts of rinse water are required. Electroplating processes require thorough rinsing of the workpiece between the various steps of pretreatment as well as during plating and after plating.

Numerous rinses are commonly employed to prevent contamination of subsequent operations by diluting the chemical films left on a workpiece by previous immersions. These rinses generally consist of tanks full of tap water that are continually overflowed by additional water wherein the "rinsing ratio" of each rinse can be calculated. In one process known as "counter-flow rinsing", there are provided several in-line tanks which define rinse stations. This type of process saves water by multiplying the dilution effect with the use of several rinse stations.

However, if the rinse tanks are not properly arranged to cooperate with an efficiently designed atmospheric evaporator, drag-out from the plating tanks becomes wasteful and expensive. The only reason for rinsing is to remove the plating chemicals from the surface of a workpiece. These chemicals are then generally flushed down the drain or sent to waste treatment.

Hence, some types of operations become too expensive due to several factors: the loss of drag-out, the treatment of the effluent to the satisfaction of the Regulatory Agency, and the cost of large amounts of water required and the associated sewer charge.

One of the more efficient recovery systems includes the counter flow of the rinse water and drag-out through several rinses to the process tank. The excess water is removed from the process solution by the evaporative tank, with the heat for evaporation being taken from the process tank. Accordingly, the atmospheric evaporator depends on wet surfaces, forced air, and the available heat taken from the solution for evaporation.

Other drag-out recovery systems employed by some platers include drag-out concentration by boiling the rinse water, reverse osmosis, and the use of ion-exchange columns to collect various components of the plating solution from the rinse water.

SUMMARY AND OBJECT OF THE INVENTION

The present invention has for an important object to provide an atmospheric evaporator for reducing the water content of various solutions in an effective efficient manner without loss of the drag-out, and reducing the need for large amounts of water along with reducing the high cost of sewer usage.

It is another object of the invention to provide an atmospheric evaporator that includes a removable blower sleeve adapted to support and house a multiplicity of finned evaporative surfaces which are sometimes referred to as "mass-pack" and "packing material".

It is still another object of the present invention to provide an atmospheric evaporator having a substantially "U" shaped conduit-duct arrangement so as to allow enough water to be removed from the solution to make room for all counter-flow rinse water.

A still further object of the invention is to provide a one-piece blower sleeve so as to make possible a solution-secure, molded tank design wherein there is established a straight-line downdraft of both air and solution that are directed through a space-saving, "U" shaped air flow, thus allowing a maximum air flow in a minimum floor space.

It is a further object of the invention to provide a device of this character that has a non-labor intensive construction, and includes simple assembly techniques having relatively few operating parts.

It is still a further object of the invention to provide a device of this character that is easy to service and maintain.

Still another object of the present invention is to provide an atmospheric evaporator that is relatively inexpensive to manufacture, and is simple yet rugged in construction.

The various features of novelty which characterize the invention are pointed out with particularity to the claims annexed to and forming a part of this disclosure. For a better understanding of the invention, its operating advantages by its use, reference should be had to the accompanying drawings and descriptive matter in which there is illustrated and described the preferred embodiment of the invention.

BRIEF DESCRIPTION OF THE DRAWINGS

Referring more particularly to the accompanying drawings, which are for illustrative purposes only:

FIG. 4 is an enlarged top-plan view of the atmospheric evaporator tank with the top of the blower sleeve shown in cross-section and the air-outlet duct removed.

DESCRIPTION OF THE PREFERRED EMBODIMENT

Figure 1:
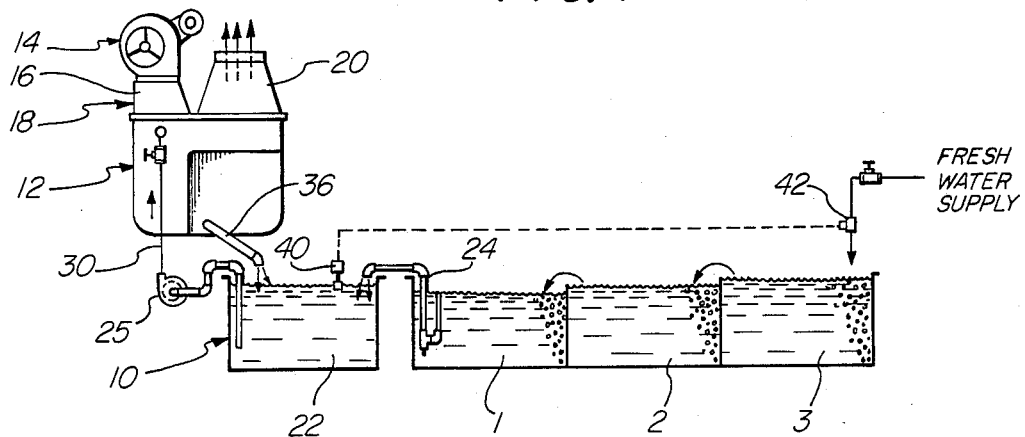
FIG. 1 is a schematic view of a rinse-recovery system including the present invention.

Referring more particularly to FIG. 1, there is illustrated a schematic drawing of a total recovery system of drag-out wherein several aligned rinse stations or tanks 1, 2 and 3 are positioned to provide continuous rinse water and drag-out counterflow through several rinses to the process tank, indicated at 10. The present invention, an atmospheric evaporator generally indicated at 12, cooperates with the process tank.

Atmospheric evaporator 12 is shown in FIG. 1 as having a blower means 14 mounted to the intake portion 16 of the blower sleeve, generally indicated at 18. An outlet duct 20 is mounted adjacent to the blower inlet, thus establishing a substantially "U" shaped duct system within evaporator tank 12.

Preferably, process tank 10 stores the required plating solution 22 which is to be transferred to a workpiece (not shown). After being immersed in process tank 10, the workpiece must then be rinsed. Rinsing is the act of removing or , more accurately, diluting the film of plating solution on the workpiece surface, and is accomplished by diluting the film of plating solution on the workpiece with large amounts of water. Thus, after the workpiece is submerged in solution 22, it is then submerged in progressive steps through rinse water in rinse stations 1, 2 and 3. When performed properly, the rinsing removes the plating chemicals from the surface of the workpiece. These chemicals are saved by a counter-flow water system wherein overflow from rinse station 3 is displaced into rinse station 2, and rinse 2 into rinse 1. Rinse 1 is provided with an air-life pump 24 which supplies solution from rinse 1 into the process solution of tank 10. Hence, excessive water must be removed from the process solution 22. This is accomplished by providing a pump means, designated at 25, interposed between process tank 10 and atmospheric evaporator 12, whereby the excess water is removed from the process solution 22 by means of atmospheric evaporator 12. Heat for evaporation is taken from the process solution as it is sprayed over evaporator means defined by finned evaporator members 28 providing about 90° square feet of wet surface area. (See FIGS. 2 and 4.) Pipeline 30 connected to pump 25 is provided with a plurality of spray heads 32 whereby solution 22 is sprayed over finned members 28 with the air forced in by blower 14. Heat for evaporation is taken from the process solution to create moist air within the "U" shaped evaporation chamber 34 defined by evaporator tank 12. This air is directed upwardly through outlet duct 20 which is generally provided with a duct line (not shown) whereby clean moist air is vented to the atmosphere.

FIG. 1 further shows a gravity drain 36 which allows the concentrated material deposited in the bottom of tank 12 to drain back into process tank 22.

In order to regulate the fresh-water supply to station 3, a level-control system is included which has a level-control unit 40 located in tank 22, the control unit being connected to a solenoid valve 42 so as to regulate the amount of fresh water that is dispensed through valve 42 into rinse station 3.

Figure 2:
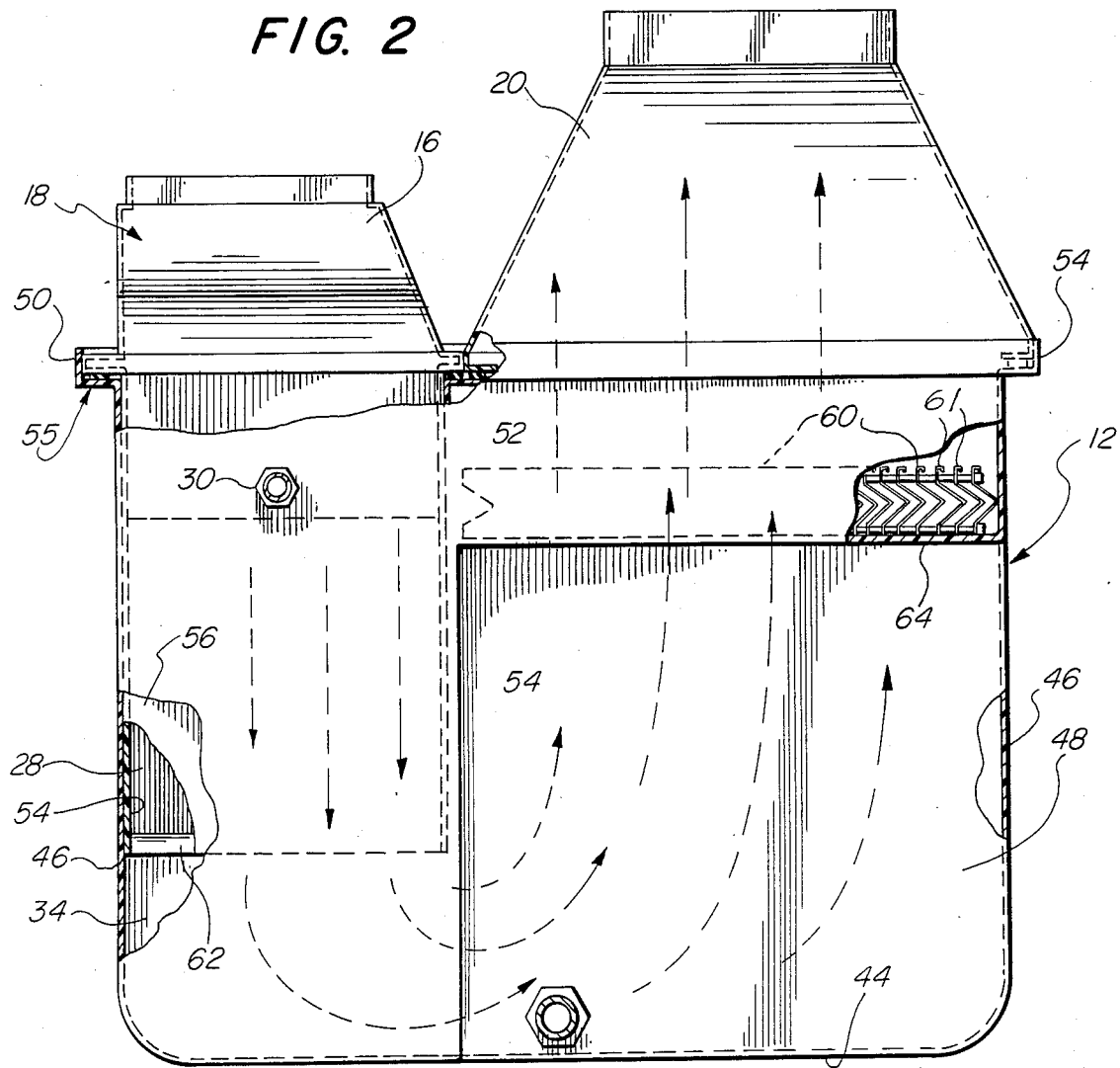
FIG. 2 is a side-elevational view of the atmospheric evaporator recovery tank with portions thereof broken away.

Atmospheric evaporator tank 12 is defined by a heavy outer shell or housing of molded, linear, high-density polyethylene having a bottom wall 44, end walls 46, and side walls 48. The upper portion of the shell has an opening defined by a peripheral flange member 50 and a transverse bar 52 formed to receive and support blower sleeve 18 and the adjacent outlet duct 20, as illustrated in FIG. 2.

Figure 3:
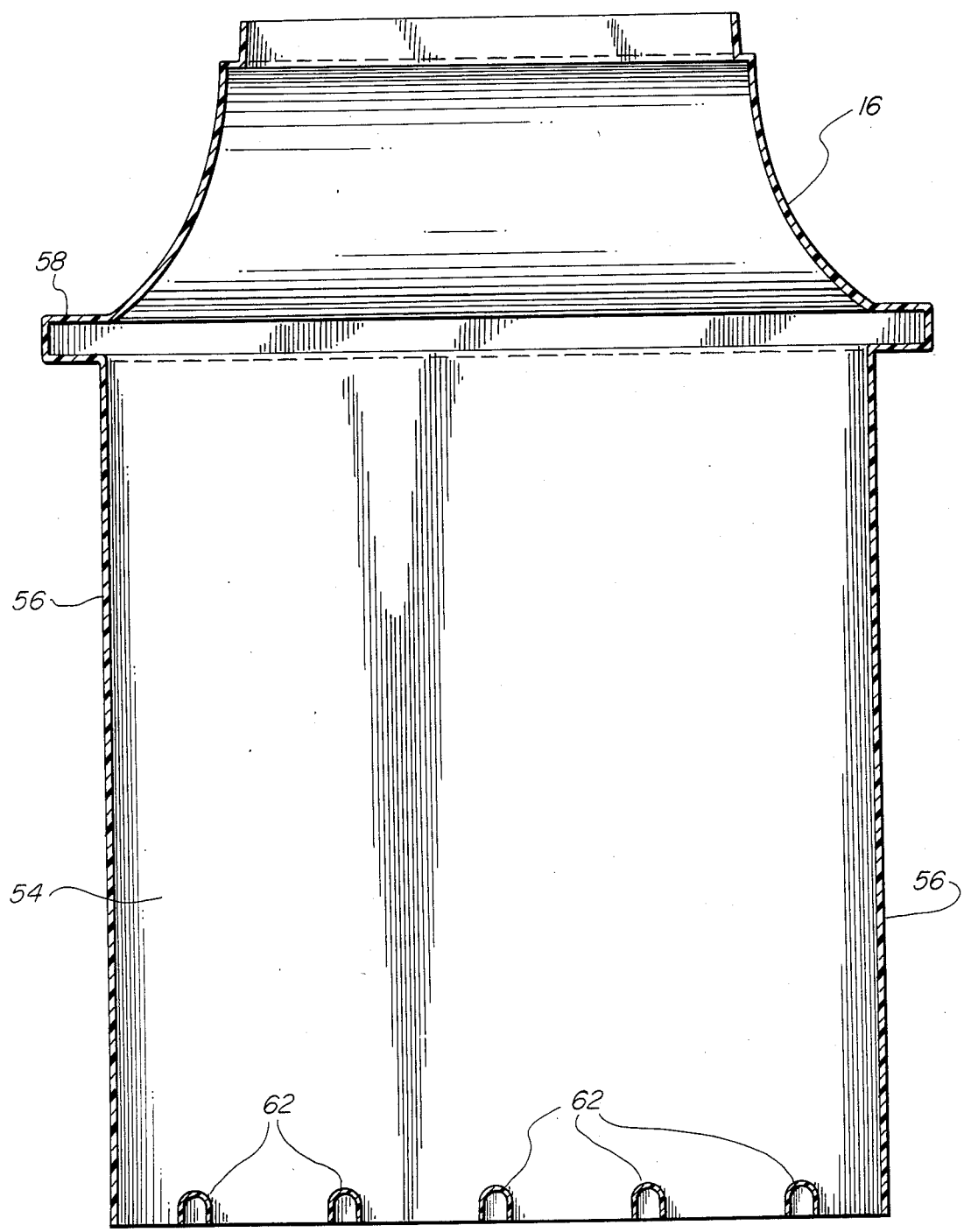
FIG. 3 is an enlarged cross-sectional view of the blower sleeve.

Blower sleeve 18 is formed as a single, seamless wet section having an inlet duct 16 on which blower 14 is mounted. The inlet duct is integrally formed with depending end walls 54 and side walls 56. An outwardly projected support shoulder 58 is formed between the inlet portion and sleeve walls 54 and 56, as better seen in FIG. 3. Bottom opening 60 includes a plurality of support struts 62 which extend horizontally across opening 60 and are formed as integral parts of side walls 54.

Accordingly, blower sleeve 18 is inserted into evaporator tank 12, the peripheral shoulder 58 being mounted so as to be supported by flange member 50. Preferably, a gasket 55 is interposed between shoulder 58 and flange 50. Blower sleeve 18 further defines a jacket for supporting several rows of closely fitted, finned evaporator members 28, as shown in FIGS. 2 and 4.

As solution 22 is forced through finned members 28, evaporation will occur, thus eliminating water but leaving all the plating chemicals (and tap water impurities) which are returned to process tank 10 by way of gravity drain 36. To provide further separation, a mist-eliminator assembly 60 is positioned just below the outlet duct 20. The mist eliminator comprises a plurality of transverse blade members 61. These blade members capture any additional dense particles which will drop back to the bottom of tank 12. Thus, all evaporation of water is discharged through outlet duct 20. The eliminator assembly 60 is supported in chamber 34 by inwardly disposed ridges 64 formed in side walls 48.

The foregoing is a description of a preferred embodiment of the invention which is given here by way of example only. The invention is not to be taken as limited to any of the specific features as described, but comprehends all such variations thereof as come within the scope of the appended claims.

What I claim is:

1. An atmospheric evaporator apparatus for separating water from a chemical solution as it passes through the atmospheric evaporator by means of a blower, said atmospheric evaporator comprising:

a one-piece, molded, evaporator tank having an inlet side and an exhaust side;

a removable one-piece, molded, blower sleeve having an inlet duct formed at one end thereof on which is supported a blower, and an evaporator-support means formed at the opposite end thereof, said blower sleeve is removably mounted in said evaporator tank;

evaporator means mounted in said blower sleeve and supported by said evaporator-support means for defining a wet surface area over which air and said chemical solution flow to provide separation of water from said chemical solution; and and outlet duct mounted over the exhaust side of said tank wherein said blower sleeve, said evaporator tank, and said outlet duct combine to define a substantially "U" shaped air flow wherein air enters from the top of said tank and is exhausted through the outlet duct positioned at the top of said tank adjacent to said inlet duct.

2. An atmospheric evaporator as recited in claim 1, wherein said evaporator-support means comprises a plurality of transverse support-strut members integrally formed at the opposite end of said blower sleeve, and wherein said evaporator means comprises a multiplicity of finned evaporator members positioned within said blower sleeve so as to be supported by said strut members.

3. An atmospheric evaporator as recited in claim 2, further comprising a mist-eliminator means positioned adjacent said outlet duct thereof.

4. In combination, a plating system and an atmospheric-evaporator unit, comprising:

a plating system having a plurality of rinse stations and a process tank wherein said rinse stations are arranged to provide a counter-flow of water and plating chemicals disposed within said stations; and an atmospheric evaporator including:

an evaporator tank having an inlet side and exhaust side;

a vertically arranged blower sleeve removably mounted at said inlet side of said tank;

an outlet duct mounted over said exhaust side of said tank; and wherein said blower sleeve is formed with an inlet duct at the upper end thereof and an evaporator-support means integrally formed at the opposite lower end of said blower sleeve;

evaporator means mounted in said blower sleeve and supported by said evaporator-support means, said evaporator means defining a wet surface area over which air and solution flow from said process tank to provide separation of water from said chemical solution;

a mist-eliminator means positioned at the exhaust side of said evaporator tank;

blower means mounted on said blower sleever for forcing air through said evaporator tank whereby said air transports moisture within said evaporator tank to said mist-eliminator means;

pump means interposed between said process tank and said evaporator; tank means for spraying the chemical solution in said process tank over said evaporator means so as to separate water from said chemical solution as said solution passes through said evaporator means with said air provided by said blower means; and means connected to said evaporator tank to return said chemicals to said process tank, whereby said blower sleeve, said evaporator tank, and said outlet duct combine to define a substantially "U" shaped air flow, wherein air enters from the top of said tank by said blower means and is exhausted through the outlet duct positioned over the exhaust side of said tank.

5. The combination as recited in claim 4, wherein said evaporator-support means comprises a plurality of transverse strut members integrally formed at said lower end of said blower sleeve positioned to support said evaporator means, and wherein said evaporator means comprises a multiplicity of finned evaporator members positioned within said blower sleeve so as to be supported by said transverse strut members.

* * * * *